United States Patent [19]

McGarry

[11] Patent Number: 4,995,110
[45] Date of Patent: Feb. 19, 1991

[54] METHOD AND APPARATUS FOR KEYBOARD ADAPTATION TO A LOW POWER CONTROLLER IN A COIN OPERATED TELEPHONE

[75] Inventor: Patrick J. McGarry, West Chester, Pa.

[73] Assignee: Mars Incorporated, McLean, Va.

[21] Appl. No.: 407,895

[22] Filed: Sep. 15, 1989

[51] Int. Cl.⁵ .................... H04M 17/00; H04M 19/00
[52] U.S. Cl. .................................. 379/155; 379/143; 379/413
[58] Field of Search ........................ 379/143, 155, 413

[56] References Cited

U.S. PATENT DOCUMENTS 4,763,348 8/1988 Sano et al. ...................... 379/413 X Primary Examiner—Stafford D. Schreyer
Attorney, Agent, or Firm—Davis Hoxie Faithfull & Hapgood

[57] ABSTRACT

A standard keyboard or keypad for a coin operated telephone is connected to balance an artificial line rather than the actual phone line. The artificial line simulates operating conditions at the end of the loop regardless of whether the phone that the keyboard is in is actually near or far from the central office. As a result, the standard keyboard can be operated using a current at or near its designed minimum operating current. Additionally, a microcontroller for controlling the operation and decoding of the keyboard is programmed to have a small duty cycle of on time during decoding so that the bulk of the power normally used by the microcontroller can be switched to the keyboard when it is detected that a key is depressed. Thus, a line powered low power controller can be used in conjunction with a standard keyboard. By reducing the number of lines used to connect the standard keyboard to the controller, an extra line is made available which allows the controller to be utilized with either a standard or a modified keyboard.

27 Claims, 3 Drawing Sheets

METHOD AND APPARATUS FOR KEYBOARD ADAPTATION TO A LOW POWER CONTROLLER IN A COIN OPERATED TELEPHONE

FIELD OF THE INVENTION

The present invention relates to low power control apparatus for coin operated telephones which control the keyboard function as well as other features in a coin operated telephone. More particularly, a method and apparatus for adapting standard or modified keypads to operate with a low power controller in a coin operated telephone is described.

BACKGROUND OF THE INVENTION

Until relatively recently, standard keypads installed in coin operated telephones generated audio signals directly onto the telephone lines. The keypads also reflected an impedance to balance the line and consequently pulled roughly 10 milliamperes (mA) during operation.

The deregulation of the telephone industry and subsequent new telephone standards created a demand for low power controllers having many features for use in coin operated telephones. These low power controllers overcame stringent power constraints by utilizing various low power circuits and power management schemes.

In one highly advanced low power electronic controller, the LES 100 WE Retrofit Kit, developed and sold by Mars Electronics, the power constraints on the controller did not permit the usage of 10 mA for use with the keypad.

Consequently, the keypads were modified to remove that line balancing capability and therefore reduce their current requirements before being connected to an audio circuit in the controller. The keypad still generated audio signals, but these signals were processed and then balanced to the line by the audio circuit, thus enabling the keypad to draw much less current when operating.

In an alternative approach, circuitry was provided to disable the keypad after a half-second of dual-tone generation by a key. This limited the power drawn by the keypad. For commercial reasons, this approach has not been accepted in the market place. For example, such approach cannot be used where it is desired to access the messages on an answering machine which is typically designed to require a 2 to 3 second tone duration to achieve access.

A minimum of four Plain Old Telephone Service (POTS) input lines were required for the low power controller keypad implementation. The input lines were used to indicate key pushed, power in, disable and return to ground.

While the Mars Electronics LES 100 has enjoyed immediate commercial success as a retrofit controller for use with standard Western Electric payphones, its installation has required the modification of every keyboard to remove its line balancing components before connection to the controller. Because all payphone keypads need modification for use with this controller, and because subsequent improvements to the controller may render older controllers employed with modified keypads obsolete, it was highly desirable to design a single controller readily suitable for use with either a standard, a modified keypad, or some other alternative keying arrangement.

SUMMARY OF THE INVENTION

It is therefore an object of the present invention to provide a method and apparatus for the low power control of a coin operated telephone which can be utilized with either modified or unmodified keypads.

A further objective of the present invention is to provide a method and apparatus for the adaptation of a low power controller with modified or unmodified keypads which uses fewer input POTS lines to operate.

Yet another objective of the present invention is to provide a method which permits a key to be depressed for an extended period of time while still conserving power.

When a coin operated telephone customer picks up the handset, power is distributed by a low power controller to a microprocessor circuit and to an audio circuit. When a key is depressed, a dual tone multi-frequency (DTMF) keypad generates a pair of tones which are monitored by a DTMF decoder circuit. These audio signals are fed to a speech network of the low power controller where they are processed and ultimately passed onto the telephone lines.

Unmodified keypads connected in the fashion typical for standard coin operated telephones required more power to operate than a line powered low power controller could supply. The present invention solves the power problem by implementing a method which puts the microprocessor into a low power or "sleep" mode for 50 millisecond (ms) intervals as the tone is generated and then revives the microprocessor for 100 microseconds (us) to see if the key has been released or if a power failure has occurred. While the microprocessor is asleep, its power is directed to the keypad. If the keypad has not been released, the microprocessor is put to sleep again and the cycle is continued. If the keypad has been released, normal processing recommences. In the event a power failure is detected, the power failure routines are then processed. In addition, an artificial line is provided to the unmodified keypad for it to balance to. This artificial line is designed so that the keypad is always biased similarly to the way that it is when it is at the end of a long loop so that the keypad draws its minimum operating current regardless of whether the phone is near or far from the central office.

Circuitry is also provided which switches a four volt DC supply for use as the "disable" signal, thereby saving a POTS input line. By eliminating the need to use a separate POTS input line for a disable line, an extra line is available for connecting to a modified keyboard audio signal. The new circuitry also mutes the microphone when the keypad is in use.

The apparatus and method of the present invention is more fully described below in conjunction with the accompanying drawings.

DETAILED DESCRIPTION

Figure 1:
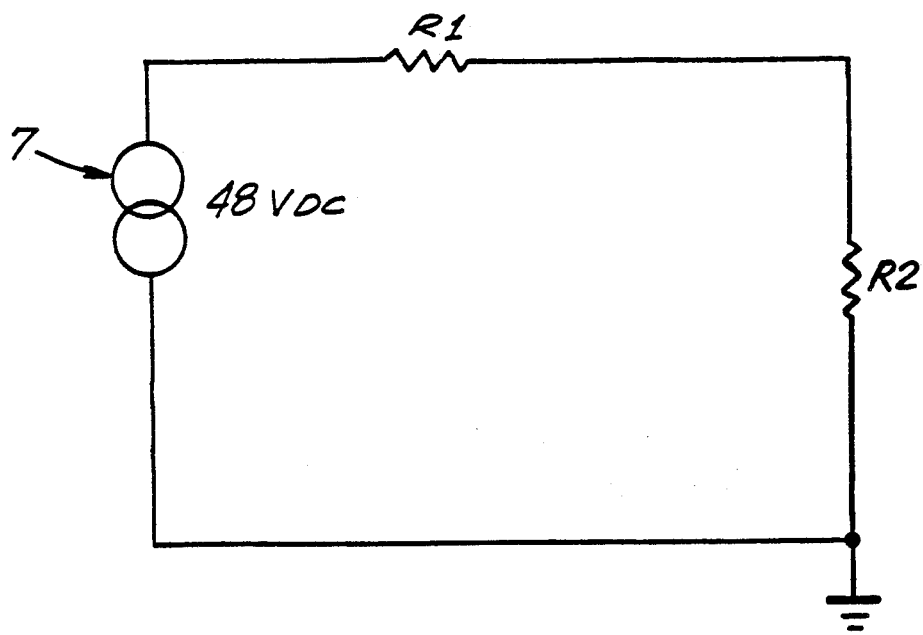
FIG. 1 is a simplified model of a telephone loop circuit with a standard keypad passively balancing the line to illustrate the prior art usage of standard keypads in standard Western Electric payphones.

FIG. 1 is a simplified model of a standard keypad represented by a resistor R2 passively balancing the phone line. FIG. 1 shows a telephone line having a 48 VDC source 7, a line resistance R1 and a keypad resistance R2. The resistor R2 crudely represents the prior art keypad operation which included balancing the line and putting audio signals directly on the line.

Figure 2:
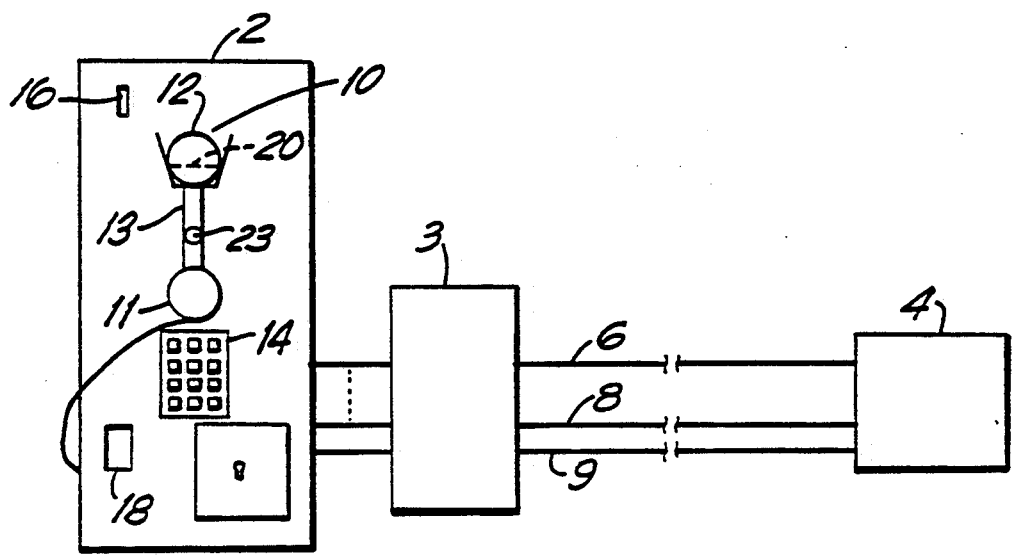
FIG. 2 is a block diagram of a telephone system consisting of a central office and a coin-operated telephone which are connected through a low power controller.

FIG. 2 is a block diagram representing a telephone system comprising a coin operated telephone 2, a low power controller 3 and a central office 4. A customer deposits coins in a coin slot 16, then uses a handset 10 and a keypad 14 to place a call. The central telephone office 4 provides various D.C. voltage amplitudes and polarities on the tip 6 and ring 8 lines from which the telephone 2 generates its operational power when the handset 10 is off-hook. As has been previously described in U.S. application Ser. No. 199,129 filed on May 26, 1988 and assigned to the assignee of the present invention, a low power controller is responsible for interpreting the operational commands from the central office 4 and for controlling the operation of the telephone 2. U.S. application Ser. No. 199,129, filed on May 26, 1988 is incorporated by reference herein. The controller of U.S. application Ser. No. 199,129 modified as shown in the present application, and as shown in U.S. application Ser. Nos. 407,896 and 407,899 filed on the same date and assigned to the same assignee as the present application and also incorporated by reference herein, is the presently preferred embodiment of the controller 3.

Figure 3:
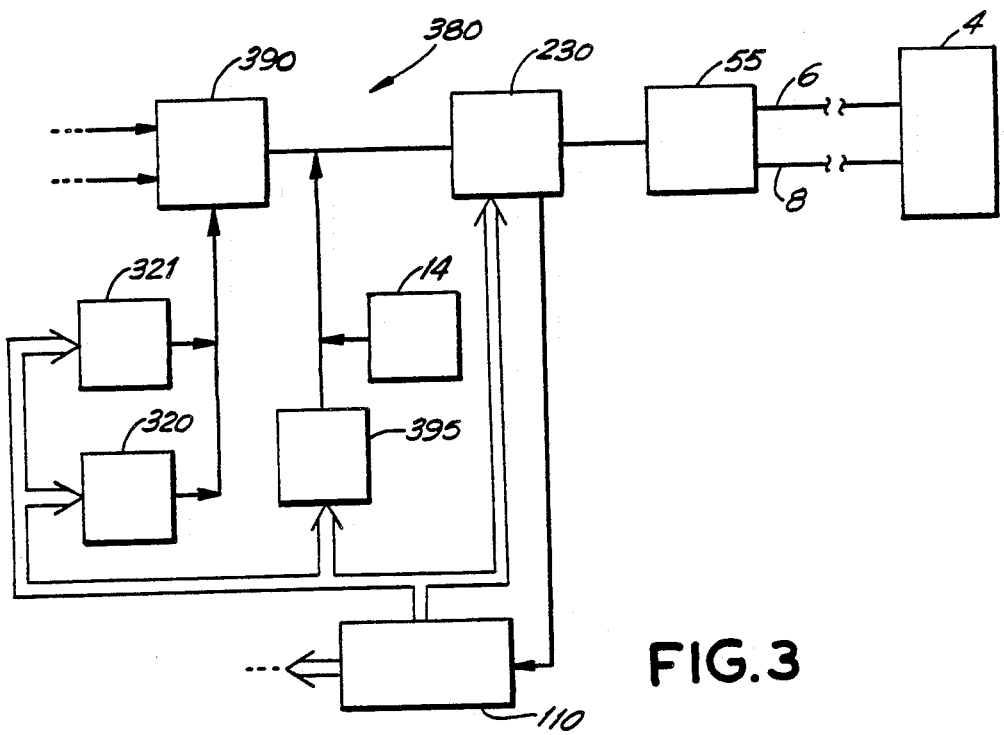
FIG. 3 is a partial block diagram of a low power controller in which the present invention may be used.

FIG. 3 is a block diagram depicting some of the connections between various circuits in the low power controller 3, detailed descriptions of which can be found in the application referred to above. The central office 4 is connected to a line interface circuit 55 which is in turn connected to power supply 230. The power supply 230 supplies power to an audio network 380 which includes a dual tone multi-frequency (DTMF) keypad 14, a DTMF decode circuit 395 and a speech network 390. When the audio network 380 is powered up it provides the coin operated telephone with the capability to transmit and receive speech and audio tone signals. A microcontroller 110 controls all the operations of the telephone including the audio network 380 and the power supply 230.

When the handset 10 of FIG. 2 is picked up by a customer to make a call, voltage from the tip 6 and ring 8 lines is connected to the power supply 230 of FIG. 3. Once charged, the power supply 230 provides power to microcontroller 110 which leaves its standby state and performs wakeup diagnostics, which includes determining if audio signals are being produced by the keypad 14.

Standard keypads while typically using an average current of 10 mA may, depending on how far the phone is from the central office, use a minimum of approximately 6 mA and still operate correctly, and have been modified to use less in order to work with the Mars prior art low power controller. A resistor was changed within the keypad to reduce the current drawn by the keypad and a capacitor was added to couple the DTMF out of the keypad. As a result, the keypad could not balance the line, and audio circuitry was provided to balance the keypad output to the phone line. In addition, a means for disabling the keypad when not in use was included to save power. Audio signals generated by the keypad were routed through the speech network 390 for processing and ultimately for output to the line. The microprocessor 110 controlled the overall operation and a power savings was realized.

Figure 4:
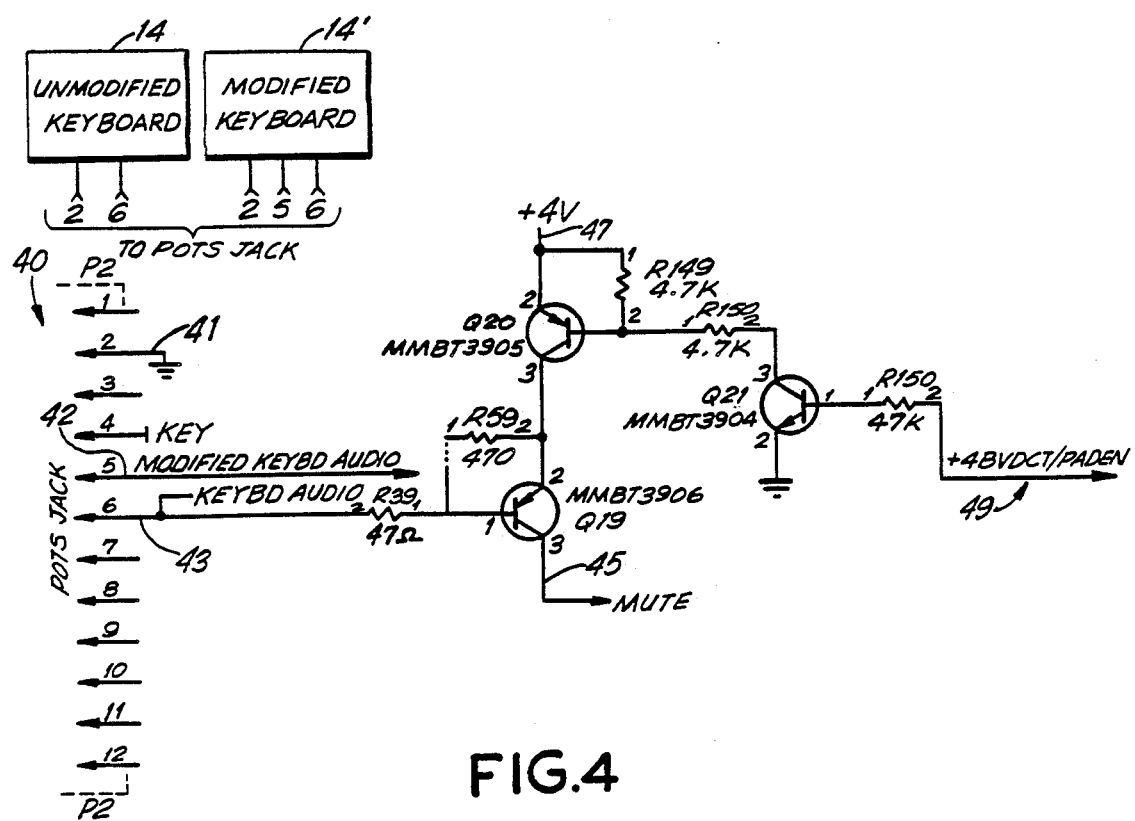
FIG. 4 is a circuit diagram of the preferred embodiment of the present invention.

FIG. 4 depicts a circuit according to the present invention which permits the use of either a modified or an unmodified keypad with a line powered low power controller. FIG. 4 shows a plurality of inputs 40 which designated POTS (Plain Old Telephone Service) JACK. Three of the POTS inputs 41, 42, and 43 are used with a modified keyboard or keypad 14', while only two inputs, 41 and 43, are required for an unmodified keyboard or keypad 14.

A disable line 49 is included, which disables the keypad by cutting off the +4 volt supply connected to line 47 when the keypad is disabled or shut off by the microcontroller 110. If enabled, when a key on the keyboard 14 is pushed, the keyboard 14 causes current to flow on line 43 through the resistor R39 to the base of transistor Q19. This enables current to flow from +4V and through the transistors to a MUTE line 45. The MUTE line 45 signals the microcontroller 110 to mute the microphone in the handset 10. The keyboard audio signal on line 43 is coupled into speech network 390 for processing via the line labeled KEYBD AUDIO.

The circuit of FIG. 4 permits a savings of two POTS input lines when the unmodified keyboard 14 is used. The circuit requires only the keyboard audio (artificial line) input 43 and a return line 41 to implement the unmodified keyboard.

The modified keyboard 14' can also be used with the present invention by connecting the keyboard 14' with a modified keyboard audio (MODIFIED KEYBD AUDIO) input line 42 which connects the keyboard's audio output to the speech network 390 for processing. For the modified keyboard, the input line 43 serves as a power supply and retains its disable and muting functions, but does not couple audio to the speech circuit. This line 42 is available because of the input line savings described above, making the circuit of FIG. 4 backwards compatible with existing modified keyboards.

A problem when using unmodified keypads with low power controllers has been that the power necessary to maintain the system when a key is pushed is more than that which can be steadily supplied by the network. The method of the present invention remedies this problem by modifying the function of the microcontroller 110 with respect to the keypad, as described below.

Figure 5:
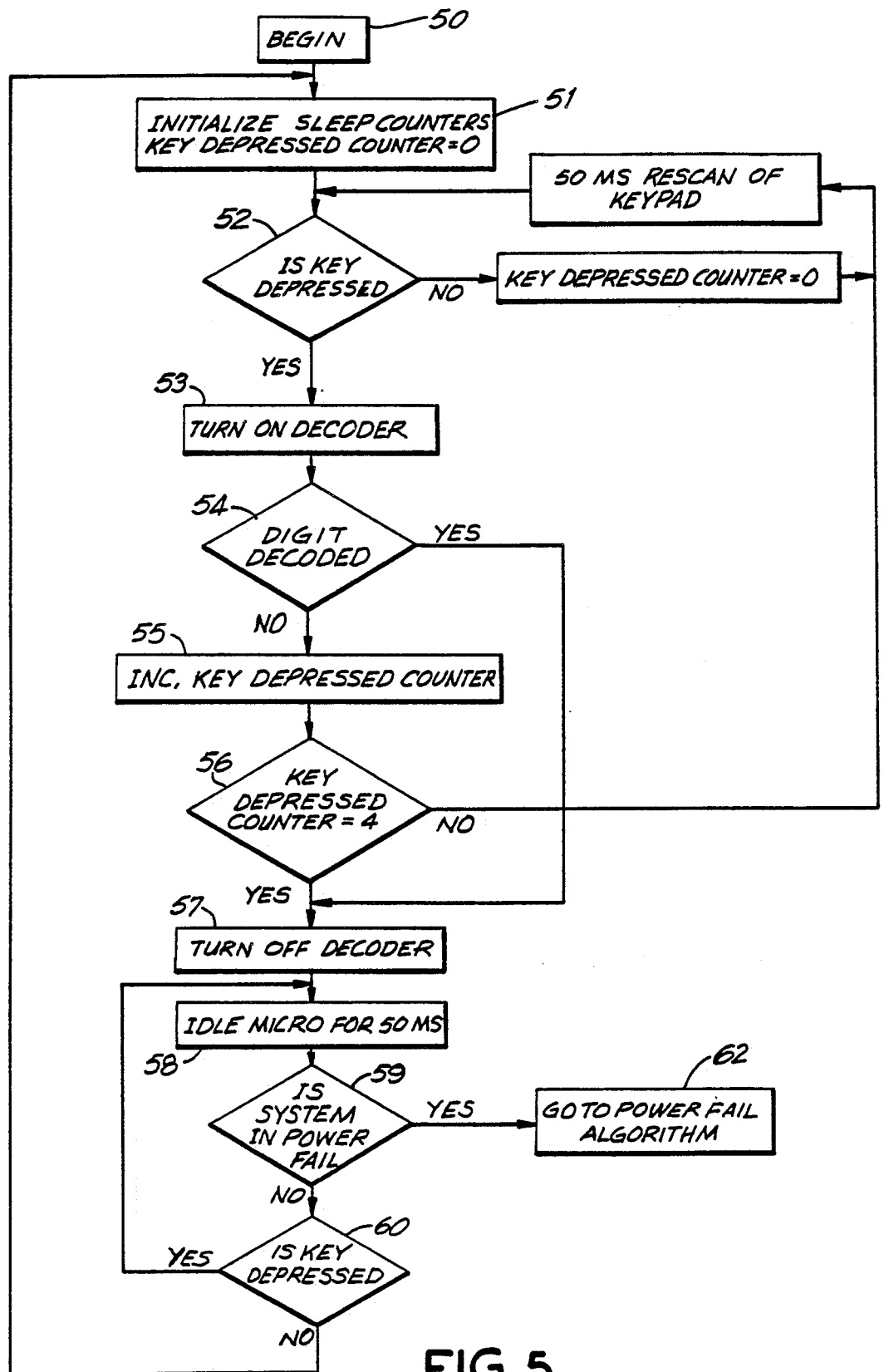
FIG. 5 is a flowchart of the method of the present invention for controlling the function of a microcontroller with respect to a keypad.

FIG. 5 is a flowchart of the preferred method for microcontroller operation when the keyboard is being used. The process begins at step 50, and sleep counters in memory are initialized while a key depressed counter is set to zero in step 51. If a key is not depressed 52, the key depressed counter is set to zero and the keypad is scanned for 50 ms. However, if a key is depressed in step 52, the decoder is turned on in step 53 and digit decoding, steps 54, 55 and 56, goes on until either it is determined that the key cannot be decoded, or the digit is decoded in step 54.

After the digit is decoded, the decoder is turned off in step 57. Next, the microcontroller 110 is put to sleep for 50 ms in step 58, and is then revived for 100 us to see if a power failure has occurred in step 59 or to see whether the key is still depressed or has been released in step 60. If the system is in power fail in step 59, then a power fail algorithm is run in step 62. However, if the system is not in power fail, and if the key is still depressed then the microcontroller 110 is again idled for 50 ms. This process is repeated until a power fail or key release occurs.

Once the key is released normal processing recommences. This process enables the microcontroller 110 of the system to work at a five hundred to one duty cycle. The microcontroller 110 is a heavy user of power in the controller 3, and when operated as described above, its power can be utilized by the keyboard 14 or 14' during the portion of a call in which a number is being dialed.

The above described circuit and process enable the use of both modified and unmodified keypads through the use of an improved low power controller power circuit and management scheme.

I claim:

1. A method for adapting a keyboard which will draw a current ranging from a minimum to a maximum standard operational current depending upon the conditions of a line to which it is connected to a line powered low power controller for a coin operated telephone connected to a phone line comprising the steps of:
   connecting the keyboard to an artificial line so that the keyboard operates using a current near its minimum current; and
   connecting an output signal from the keyboard to an audio circuit in the line powered low power controller which balances the output signal to the phone line.

2. The method of claim 1, further comprising the step of:
   detecting operation of a key of the keyboard by sensing a signal level on the artificial line.

3. The method of claim 1, further comprising the step of:
   utilizing the artificial line to control disabling of the keyboard.

4. The method of claim 1, further comprising the step of:
   operating a microcontroller with a low duty cycle so that power can be switched to the keyboard rather than the microcontroller when use of the keyboard is detected.

5. The method of claim 4, further comprising the step of:
   detecting when a key appears to have been depressed for an inordinately extended period of time; and
   disabling the keyboard to reduce the power drain on said controller upon detection of apparent key depression for the inordinately extended period of time.

6. A method of controlling a keyboard with a microcontroller of a line powered low power controller for a coin operated telephone comprising the steps of:
   detecting whether any key of the keyboard has been depressed;
   idling the microcontroller in a sleep state for a first predetermined period of time after detection that a key has been depressed; and
   making power normally used by the microcontroller available to operate the keyboard.

7. The method of claim 6, further comprising the steps of:
   waking the microcontroller for a second predetermined period of time which is substantially shorter than the first predetermined period of time, at the end of the first predetermined period of time; and
   checking during the second predetermined period of time to see if the key is still depressed.

8. The method of claim 7, further comprising the step of:
   detecting when a key appears to have been depressed for an inordinately extended period of time; and
   disabling the keyboard to reduce the power drain on said controller upon detection of apparent key depression for the inordinately extended period of time.

9. The method of claim 7, further comprising the steps of:
   detecting when the key has been released; and
   performing the step of detecting whether any key of the keyboard has been depressed during a third period of time which is substantially longer than the second predetermined period of time.

10. The method of claim 9, further comprising the step of:
    idling the microcontroller in a sleep state for a fourth predetermined period of time upon detection that none of the keys of the keyboard have been depressed.

11. The method of claim 10, further comprising the steps of:
    waking the microcontroller at the end of the fourth predetermined period of time; and
    repeating the step of detecting whether any key of the keyboard has been depressed.

12. The method of claim 6, further comprising the steps of:
    turning on a decoder upon detection that a key has been depressed; and
    subsequently turning off the decoder when the key is properly decoded.

13. A low power controller for a coin operated telephone connected to a phone line, said controller being adapted for operation with a keyboard which will draw a current ranging from a minimum to a maximum standard operational current depending upon the conditions of a line to which it is connected, said controller comprising:
    an artificial line connected to the keyboard for providing line conditions so that the keyboard operates using a current near its minimum standard operational current, said artificial line producing an output signal; and
    an audio circuit connected to the artificial line output signal for balancing the output signal to the phone line.

14. The low power controller of claim 13, further comprising:
    a detection circuit connected to the artificial line, said detection circuit detecting whether any key of the keyboard has been depressed.

15. The apparatus of claim 13, further comprising:
    a keyboard disabling circuit connected to the artificial line, said keyboard disabling circuit controlling the disabling of the keyboard.

16. The apparatus of claim 13, further comprising:
    a microcontroller operated with a low duty cycle so that power can be switched to the keyboard rather than the microcontroller when use of the keyboard is detected.

17. The apparatus of claim 13, further comprising:

a detection circuit connected to the artificial line, said detection circuit detecting whether any key of the keyboard has been depressed;

a keyboard disabling circuit connected to the artificial line, said keyboard disabling circuit controlling the disabling of the keyboard; and a microcontroller operated with a low duty cycle so that power can be switched to the keyboard rather than to the microcontroller when use of the keyboard is detected.

18. A method of reducing the number of input lines required to connect a keyboard to a low power controller for a coin operated telephone comprising the steps of:

utilizing a single line to connect the telephone keyboard to a keyboard disabling circuit, a detection circuit for detecting whether any key of the keyboard has been depressed, and a supply of power for the keyboard; and eliminating the usage of a pair of separate lines formerly used to connect the keyboard disabling circuit, the power supply and the detection circuit to the keyboard.

19. A method of reducing the number of input lines required to connect a keyboard to a low power controller for a coin operated telephone comprising the steps of:

utilizing a single line to connect the telephone keyboard to a keyboard disabling circuit, and a detection circuit for detecting whether any key of the keyboard has been depressed; and eliminating the usage of one pair of separate lines formerly used to connect the keyboard disabling circuit and the detection circuit to the keyboard.

20. A method of reducing the number of input lines required to connect a keyboard to a low power controller for a coin operated telephone comprising the steps of:

utilizing a single line to connect the telephone keyboard to a keyboard disabling circuit, and a supply of power for the keyboard; and eliminating the usage of one pair of separate lines formerly used to connect the keyboard disabling circuit and the power supply to the keyboard.

21. A method of reducing the number of input lines required to connect a keyboard to a low power controller for a coin operated telephone comprising the steps of:

utilizing a single line to connect the telephone keyboard to a detection circuit for detecting whether any key of the keyboard has been depressed, and a supply of power for the keyboard; and eliminating the usage of one of a pair of separate lines formerly used to connect the keyboard detection circuit and the power supply to the keyboard.

22. The method of claim 18, 19, 20 or 21, further comprising the steps of:

reserving said one of the lines eliminated from usage for the optional connection of a different style of keyboard to the low power controller.

23. The method of claim 4 wherein the microcontroller operates at a five hundred to one duty cycle.

24. The method of claim 6, further comprising the steps of:

turning on the decoder upon detection that a key has been depressed; and subsequently turning off the decoder if it is determined that the key cannot be decoded.

25. A low power controller for a coin operated telephone connected to a phone line, said controller being adapted for operation with either a standard keyboard which will draw a current ranging from a minimum to a maximum standard operational current depending upon the conditions of a line to which it is connected, or with a modified keyboard, said controller comprising:

an artificial line for connection to a standard keyboard for providing line conditions so that the standard keyboard can operate using a current near its minimum standard operational current, said artificial line producing an output signal;

a modified keyboard audio line for connection to a modified keyboard so that the output of the modified keyboard can be used;

an audio circuit for connection to either the artificial line output signal for balancing the output signal of the standard keypad to the phone line, or for connection to the modified keyboard audio line for processing the output signal of the modified keyboard.

26. The apparatus of claim 25, wherein the artificial line is connected to either a modified keypad or a standard keypad and is connected to circuitry that detects when a key is depressed, that provides power to the keyboard, and that disables the keyboard.

27. The keyboard of claim 25, further comprising:

a detection circuit connected to the artificial line, said detection circuit detecting whether any key of the keyboard has been depressed;

a keyboard disabling circuit connected to the artificial line, said keyboard disabling circuit controlling the disabling of the keyboard; and a microcontroller operated with a low duty cycle so that power can be switched to the keyboard rather than to the microcontroller when use of the keyboard is detected.

* * * * *

UNITED STATES PATENT AND TRADEMARK OFFICE
CERTIFICATE OF CORRECTION

PATENT NO. : 4,995,110

DATED : February 19, 1991

INVENTOR(S) : McGarry

It is certified that error appears in the above-identified patent and that said Letters Patent is hereby corrected as shown below:

Column 4, line 14, insert --is-- before "designated".
Column 4, line 58, insert --in step-- after "depressed".

Claim 5, column 5, line 47, delete "step" and insert --steps--.
Claim 8, column 6, line 5, delete "step" and insert --steps--.
Claim 19, column 7, line 33, insert --of a-- following "one".
Claim 20, column 7, line 44, insert --of a-- following "one".
Claim 22, column 8, line 5, delete "steps" and insert --step--.
Claim 27, column 8, line 43, delete "keyboard" and insert --apparatus--.

Signed and Sealed this

Thirteenth Day of April, 1993

Attest:

STEPHEN G. KUNIN

Attesting Officer     Acting Commissioner of Patents and Trademarks